UNITED STATES PATENT OFFICE.

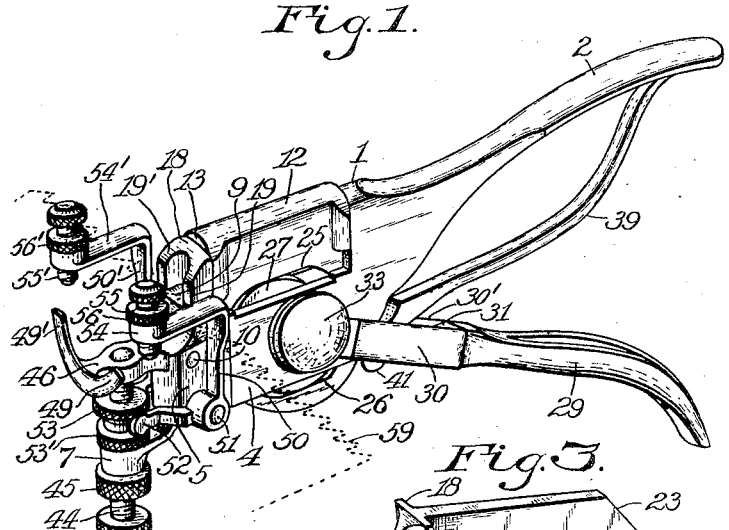
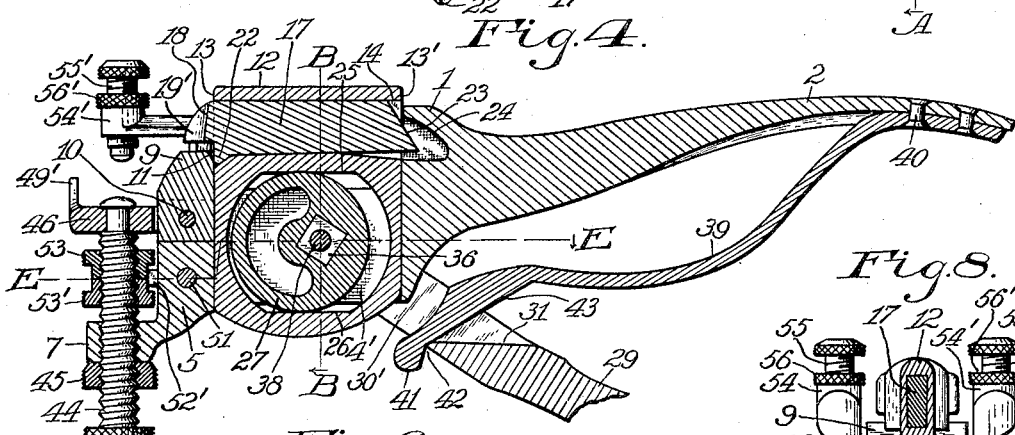
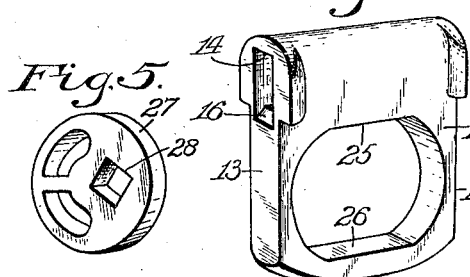

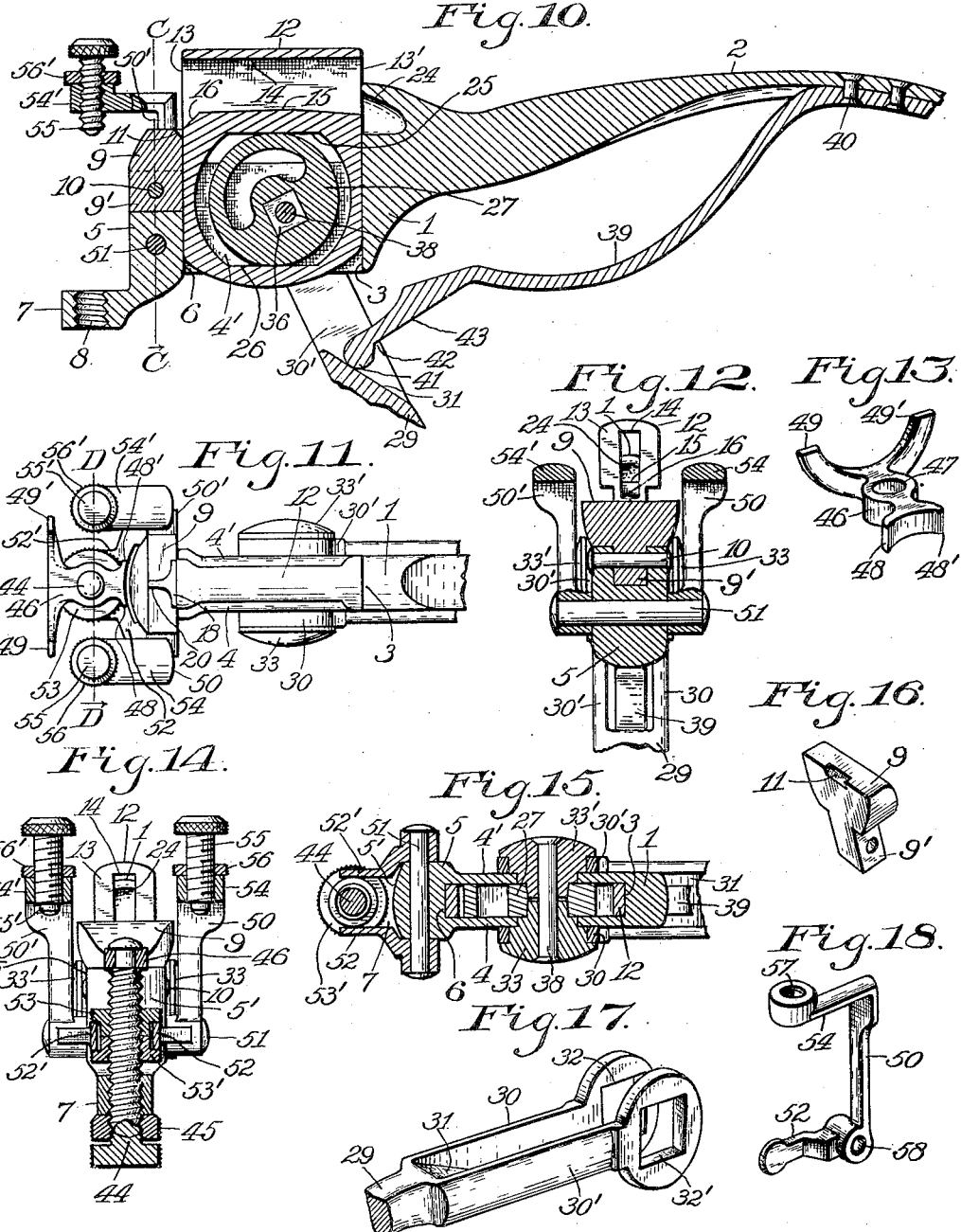

THOMAS GRIFFIN, OF NOBLESVILLE, INDIANA; GEORGE GRIFFIN ADMINISTRATOR OF SAID THOMAS GRIFFIN, DECEASED.

SAW-SET.

1,057,342. Specification of Letters Patent. Patented Mar. 25, 1913.

Application filed January 25, 1911. Serial No. 604,603.

*To all whom it may concern:*

Be it known that I, THOMAS GRIFFIN, a citizen of the United States, residing at Noblesville, in the county of Hamilton and State of Indiana, have invented a new and useful Saw-Set, of which the following is a specification, reference being had to the accompanying drawings and to the letters and figures of reference marked thereon.

This invention relates to hand tools for setting the teeth of saws, for a well known purpose, the invention having reference more particularly to a saw setting tool that is adapted to operate expeditiously and reliably on either coarse or fine saws.

The object of the invention is to provide an improved saw setting tool that will be capable of setting two or more saw teeth at each operation or to set one tooth at a time, as may be desired, a further object being to provide a powerful and quick acting saw set that will be capable of setting the teeth accurately to any desired degree of inclination, and which will be durable and economical in use.

The above mentioned and minor objects are attained in the implement illustrated in the accompanying drawings, the invention comprising an implement provided with a plurality of different setting dies which are removable and interchangeable; in certain novel parts of the implement, and in the combinations and arrangements of parts as hereinafter particularly described and claimed.

Referring to the drawings, Figure 1 is a perspective view of the improved saw setting tool; Fig. 2, a front elevation of the tool in which the end of the operating lever thereof is broken away; Fig. 3, a perspective view of one of the setting dies; Fig. 4, a longitudinal section on the line A A in Fig. 2; Fig. 5, a perspective view of an eccentric comprising a part of the operating lever; Fig. 6, a perspective view of the die holder; Fig. 7, a perspective view of a triple die; Fig. 8, a section on the line B B in Fig. 4; Fig. 9, a perspective view of one of the parts of the operating lever; Fig. 10, a section on the line A A in which parts of the implement are omitted; Fig. 11, a fragmentary top plan of the implement; Fig. 12, a section on the line C C in Fig. 10; Fig. 13, a perspective view of one of the guides of the implement; Fig. 14, a section approximately on the plane of the line D D in Fig. 11; Fig. 15, a fragmentary section on the line E E in Fig. 4; Fig. 16, a perspective view of the anvil on which the teeth are shaped or set; Fig. 17, a perspective view of a portion of the operating lever; and Fig. 18, a perspective view of one of the combination guides with which the implement is provided.

Similar reference characters throughout the drawings indicate like elements or features of construction herein referred to and described.

The improved saw-setting tool comprises a metallic frame of suitable form which includes a main portion 1 on which is a rearwardly extending handle 2, the main portion having a straight front face extending transversely and constituting a guide 3, two side portions 4 and 4' extending from the guide forwardly and connected at their forward ends to a head portion 5 having a rounded front face 5', the rear inner face being straight and constituting a guide 6 which is parallel to the guide 3, the head portion 5 of the frame having a bracket 7 on the lower portion thereof that extends forwardly and downwardly and has screw threads 8 therein. A suitable anvil 9 is provided which preferably is composed of steel, hardened, and has a shank 9' which is suitably inserted in the head portion 5 of the frame and secured thereto by means of a rivet 10, with the inner or rear side of the anvil flush with the inner side of the head portion 5, so as to constitute a continuation of the guide 6. The rear portion of the top of the anvil has a recess 11 therein.

A suitable tool holder 12 is provided that is adapted to operate in the frame between the portions 4 and 4', and it has two guide-faces 13 and 13' in slidable contact with the guides 6 and 3, respectively. The upper portion of the holder has a socket or opening therein that extends substantially at right angles to the guide faces 13, 13'. The upper side wall of the socket or opening constitutes a bearing 14 and the opposite side constitutes a bearing 15 which is slightly inclined to the opposite bearing, the opening being rectangular in cross-section and slightly larger in diameter at the guide face 13 than at the middle portion of the opening, and a recess 16 is formed at the end of the bearing 15 adjacent to the guide-face 13 so as to be opposite the recess 11 in the anvil, the two recesses being designed to be V-shaped in cross-section to serve as guides.

Any desired number of setting dies are provided, each comprising a shank, as 17, 17′ or 17″, all being alike, each shank having a head 18 thereon on which are two fingers 19 and 19′ or a single finger 20, or a greater number of fingers 21, 21′, 21″, as may be desired. The under side of each shank has a projection 22 thereon back of the head adapted to fit into the recess 16 when the shank is in its socket and to engage the inclined face of the recess 11 for forcing the shank tightly into its socket, each shank being slightly tapering so as to be held tightly and solidly against the bearing 14. The rear end of each shank has an inclined face 23 facing upwardly, and the end of the shank extends into the recess 24 formed in the main portion 1 of the frame, and when the carrier 12 is forced upward farther than its normal travel the inclined face 23 is forced against the upper wall of the recess 24 for forcing the shank forwardly so as to loosen it from its socket bearings. The holder 12 has an opening in its body portion at the upper side of which a straight bearing 25 is formed that is approximately parallel to the bearing 14, a bearing 26 being formed opposite and parallel to the bearing 25 at the lower side of the opening. A circular disk is provided and adapted to fit between the bearings 25 and 26 and between the side portions 4 and 4′ of the frame to constitute an eccentric 27 having a squared axial opening 28 therein arranged at one side of the center of the disk, the eccentric comprising a part of the operating lever 29 to which it is suitably secured, the lever preferably having two arms 30 and 30′ between which is a spring-bearing 31 extending obliquely to the plane of the lever. The arms have squared apertures 32 and 32′ therein respectively in which trunnions 33 and 33′ are inserted, each trunnion having a squared portion 34 fitting into the squared opening 32 or 32′, and also a cylindrical portion constituting a journal 35 fitted into the frame portion 4 or 4′ so as to rotate therein. Each trunnion has a squared inner end portion 36 which is fitted into the squared opening 28 of the eccentric from either side thereof, and each trunnion has an axial bore 37 receiving a rivet 38 which secures the two trunnions in position so as to securely connect the eccentric to the operating lever, the arrangement being such that when the lever is moved toward the handle 2 the eccentric forces the holder 12 downward to carry the finger of the setting-die to the anvil, reverse motion retracting the setting-die. A curved plate spring 39 is secured at one end to the under side of the end portion of the handle 2 by means of rivets 40 or like securing devices, the spring extending between the arms 30 and 30′ and having a rounded head 41 behind which is a shallow notch 42 adapted to receive the acute angled end of the spring-bearing 31 to normally limit the movement of the lever 29 away from the handle 2, the under side of the free end portion of the spring having a straight bearing face 43 against which the end of the spring-bearing may slide when the lever is moved in normal operation. When the lever is forced downward beyond its normal position, as in Fig. 10, to permit changing of the setting-dies the rounded end 41 comes in contact with the face of the spring-bearing 31 so that the spring may be forced back to its operative position on return of the lever to its normal position.

An adjusting screw 44 is inserted in the bracket 7 in contact with the screw threads 8 and extends upward opposite the front of the anvil 9, there being a lock-nut 45 on the screw to be set up against the under side of the bracket, the latter being boss-shaped. A guide-head 46 has a hole 47 therein to receive the upper end portion of the screw which is suitably fitted so as to rotate in the hole, and the guide-head has two oppositely projecting fingers 48 and 48′ extending in contact with opposite sides of the rounded front of the anvil to prevent the guide-head from rotating, and the forward portion of the guide-head has two upwardly extending arms 49 and 49′ thereon. Two guide-arms 50 and 50′ are connected to a pivot 51 which is mounted in the head portion 5 of the frame, the arms extending upward at opposite sides of the head portion and to opposite sides of the head 18 of the setting-die. The arms 50 and 50′ have controlling members 52 and 52′ thereon, respectively, that extend at opposite sides of the adjusting screw 44 and are engaged by opposing nuts 53 and 53′ having adjacent reduced end portions that are normally close or nearly close together when the nuts are both moved into contact with the controlling members, so that the two nuts together form a groove into which the controlling members extend. The upper portions of the guide-arms 50 and 50′ have forwardly extending bars 54 and 54′ thereon, respectively, in which guide screws 55 and 55′ are mounted and provided with lock-nuts 56 and 56′, respectively, the bars having screw-threaded holes 57 therein to receive the screws. The arms 50 and 50′ have each a pivot-hole 58 therein to receive the pivot 51, the arms preferably turning on the pivot, and the latter being suitably secured in the head portion 5.

In practical use a saw 59, indicated by broken lines, is suitably held in approximately horizontal position and the operator holds the handle 2 in one hand with his fingers embracing the lever 29, and the implement is placed in connection with the saw, so that the screws 55 and 55' are in contact with the upper side of the saw and the arms 49 and 49' against the under side of the saw, the saw teeth being between the anvil and the finger or fingers of the setting die, the upper portions of the arms 50 and 50' being against the points of the teeth. The teeth of a coarse saw are preferably set by means of the setting die having a single finger 20, the close-toothed saws being more expeditiously set by means of the setting-die having two or more fingers thereon. Adjustment of the implement with respect to the saw is made by turning the screw 44 or the nuts 53 and 53' on the screw or by turning the screws 55 and 55', as may be necessary to guide the working face of the anvil in the desired angle to which the teeth are to be set, the arms 50 and 50' being adjusted to the required degree to enable the fingers on the setting die to reach toward the bases of the teeth the desired extent. When it is desired to change the setting dies the lever 29 is thrown downward as in Fig. 10, so as to release the shank 17 which may be then withdrawn from its socket and another shank inserted, after which the lever is moved upward and forcing the projection 22 against the inclined face 11 of the anvil forces the shank tightly into its socket as the carrier 12 is forced downward.

Having thus described the invention, what is claimed as new, is—

1. A saw-setting tool including a frame and a die-holder slidingly guided therein, an anvil fixed on the frame, a setting-die in the die-holder, a trunnion rotative in the frame, an eccentric movable in the die-holder and secured to the trunnion and engaging the die-holder, and a lever secured to the trunnion.

2. A saw-setting tool including a frame and an anvil thereon, a die-holder mounted movably in the frame, a setting-die mounted removably in the die-holder opposite the anvil, means for moving the die-holder to carry the setting die away from the anvil, and means for automatically ejecting the setting-die from the die-holder when carried away from the anvil.

3. A saw-setting tool including a frame having a handle, an anvil on the frame, a movable die-holder slidingly guided in the frame and having a socket therein, a setting-die in the socket to coöperate with the anvil and removable from the socket across the anvil when carried by the die-holder beyond operative position relative to the anvil, a lever mounted in the frame and coöperating with the die-holder to operate the setting-die, and a spring coöperating with the handle and the lever to maintain the setting-die in operative position and to controllably move the die-holder to carry the setting-die beyond operative position.

4. A saw-setting tool including a frame having a guideway therein and a head beyond the guideway, an anvil on the head, two guide arms pivotally connected to the head and extending to opposite sides of the anvil, each arm having a guide bar thereon extending opposite the plane of the top of the anvil, two adjusting screws mounted in the bars respectively, means for adjustably fixing the guide arms, a die-holder guided in the guideway, and a setting-die in the die-holder and extending opposite the top of the anvil between the guide arms.

5. A saw-setting tool including a frame having an anvil thereon, a setting-die mounted movably on the frame opposite the anvil, means for moving the setting-die, an adjusting-screw mounted on the frame in proximity to the anvil, a guide-head mounted on the adjusting-screw, two guide arms pivotally mounted on the frame and extending to opposite sides of the anvil, the guide-arms having controlling members thereon extending to opposite sides of the adjusting-screw, and two nuts on the adjusting-screw engaging the controlling members.

6. In a saw-setting tool, the combination of a frame having a guideway therein, an anvil on the frame adjacent the guideway, a die-holder slidingly guided in the guideway and having a socket therein to be carried beyond the plane of the top of the anvil, an eccentric in the die-holder in contact therewith, a trunnion rotatable in the frame and fixed to the eccentric, an operating lever fixedly connected to the trunnion, and a plurality of setting-dies having each a shank and also one or more fingers, the shanks being insertible separately into said socket.

7. In a saw-setting tool, the combination of a frame having a guide-way therein, a die-holder movable in the guide-way and having an opening therein, an eccentric arranged in the guideway and in the opening in engagement with the die-holder, an operating lever, and means for supporting the eccentric in the frame and connecting the lever to the eccentric.

8. In a saw-setting tool, the combination of a hollow frame having a head portion, an anvil secured upon the head portion and having a rear inclined portion, a die-holder guided movably in the hollow frame adjacent the head portion and having a socket therein, the die-holder having an inclined face at the mouth of the socket, means for moving the die-holder, and a setting-die seated removably in the socket and having a projection extending into contact with the inclined face and forced thereto by contact with the inclined portion of the anvil.

9. In a saw-setting tool, the combination of a frame having an opening therein and guides at opposite sides of the opening, the frame having a recess therein extending from one of the guides, a die-holder movable in the opening in contact with the guides and having a socket extending therethrough to the recess, means mounted in the frame for moving the die-holder, and a setting-die having a shank seated in the socket and extending into the recess, the end of the shank being inclined to engage the wall of the recess for ejecting the shank from the socket.

10. In a saw-setting tool, the combination of a frame having a projecting handle, the frame having a guideway therein, an anvil on the frame adjacent the guideway, a die-holder slidingly guided in the guideway, a lever pivotally mounted in the frame and extending opposite the handle and provided with a spring-bearing having an end, an eccentric fixedly connected to the lever and having sliding contact with the die-holder, a setting-die removably inserted in the die-holder to be carried thereby beyond the anvil, a spring secured to the end portion of the handle and having a rounded end to operate in sliding contact with the spring-bearing, said end normally extending beyond the spring-bearing and having a recess in a portion thereof to normally receive the end of the spring-bearing, and means enabling the lever to eject the setting-die from the die-holder on movement of the lever to draw the end of the spring-bearing from the recess and bring the spring-bearing into contact with the rounded end of the spring.

11. In a saw-setting tool, the combination of a hollow frame having a head portion, an anvil on the head portion, a die-holder movably mounted in the hollow frame adjacent the anvil, means for moving the die-holder, a setting-die in the die-holder, an adjusting screw mounted in the head portion, two guide-arms pivoted to the head portion and having controlling members thereon extending to the adjusting-screw, the guide-arms having also lateral bars on their free ends, guide-screws mounted in the lateral bars, and two nuts on the adjusting-screw engaging opposite sides of the controlling members.

12. In a saw-setting tool, the combination of a hollow frame having a head portion, an anvil on the head portion having a rounded front side, a die-holder movably mounted in the hollow frame adjacent the anvil, means for moving the die-holder, a setting-die in the die-holder, an adjusting-screw mounted in the head portion, a guide-head mounted on the screw and having fingers guided against opposite sides of the rounded side of the anvil, the guide-head having also two arms thereon extending toward the plane of the top of the anvil, and a lock-nut on the adjusting-screw against the head portion.

13. In a saw-setting tool, the combination of a hollow frame having guide-ways therein, a die-holder guided on the guideways and having an opening therein, an eccentric in the opening having a squared aperture therein, a lever having two arms extending at opposite sides of the hollow frame and having squared apertures therein, two trunnions having squared portions inserted in the apertures of the arms and also squared portions inserted in the aperture of the eccentric, two trunnions having also journals rotatively mounted in the side walls of the hollow frame and axial holes extending therethrough, a rivet extending through the holes and securing the trunnions to the arms and the eccentric, and a setting-die in the die-holder.

In testimony whereof, I affix my signature in presence of two witnesses.

THOMAS GRIFFIN.

Witnesses:
R. R. FOLAND,
W. E. DUNN.

---

Copies of this patent may be obtained for five cents each, by addressing the "Commissioner of Patents. Washington, D. C."